United States Patent
Dix et al.

(10) Patent No.: US 11,292,163 B2
(45) Date of Patent: Apr. 5, 2022

(54) METHOD OF FORMING POLYMERIC FOAM AND RELATED FOAM ARTICLES

(71) Applicant: MuCell Extrusion, LLC, Woburn, MA (US)

(72) Inventors: Samuel Edward Dix, Newburyport, MA (US); Jere R. Anderson, Newburyport, MA (US); Mark E. Lindenfelzer, Milton, MA (US)

(73) Assignee: MuCell Extrusion, LLC, Woburn, MA (US)

( * ) Notice: Subject to any disclaimer, the term of this patent is extended or adjusted under 35 U.S.C. 154(b) by 293 days.

(21) Appl. No.: 13/834,705

(22) Filed: Mar. 15, 2013

(65) Prior Publication Data

US 2013/0303645 A1 Nov. 14, 2013

Related U.S. Application Data

(60) Provisional application No. 61/618,281, filed on Mar. 30, 2012.

(51) Int. Cl.
*B29C 44/56* (2006.01)
*B29C 44/46* (2006.01)
(Continued)

(52) U.S. Cl.
CPC ........ *B29C 44/5654* (2013.01); *B29C 44/468* (2013.01); *B29C 44/56* (2013.01);
(Continued)

(58) Field of Classification Search
USPC ......... 264/50, 54, 139, 145, 173.12, 173.16, 264/177.17, 564
See application file for complete search history.

(56) References Cited

U.S. PATENT DOCUMENTS 3,322,870 A * 5/1967 Sacks ................. B29C 47/0023
264/209.5
3,865,915 A * 2/1975 Garner ................ B29C 44/0461
264/139
(Continued)

FOREIGN PATENT DOCUMENTS

CN 101600568 A 12/2009
EP 0 667 234 A1 8/1995
(Continued)

OTHER PUBLICATIONS

Partial Supplementary European Search Report dated Mar. 16, 2016 for Application No. EP 13768063.3.
(Continued)

*Primary Examiner* — Atul P. Khare
(74) *Attorney, Agent, or Firm* — Wolf, Greenfield & Sacks, P.C.

(57) ABSTRACT

Methods of forming polymeric foams are provided. The methods may involve co-extruding a foam layer along with one or more skin layers. In some embodiments, the skin layer(s) may be removed (e.g., in a peeling operation); while, in other embodiments, the skin layer(s) may form part of the final article. The methods are particularly well suited for producing polymeric foams from polymeric materials that are considered to be difficult to foam by those of skill in the art.

15 Claims, 3 Drawing Sheets

(51) Int. Cl.
  B29C 48/32 (2019.01)
  B29C 48/285 (2019.01)
  B29C 48/21 (2019.01)
  B29C 48/10 (2019.01)
  B29C 48/09 (2019.01)
  B29L 22/00 (2006.01)
  B29K 27/00 (2006.01)
  B29K 267/00 (2006.01)
  B29K 77/00 (2006.01)
  B29K 75/00 (2006.01)
  B29L 7/00 (2006.01)
  B29C 48/00 (2019.01)
  B29C 48/305 (2019.01)
  B29C 48/08 (2019.01)

(52) U.S. Cl.
  CPC .............. B29C 48/09 (2019.02); B29C 48/10 (2019.02); B29C 48/21 (2019.02); B29C 48/297 (2019.02); B29C 48/32 (2019.02); B29C 48/0012 (2019.02); B29C 48/0022 (2019.02); B29C 48/08 (2019.02); B29C 48/305 (2019.02); B29K 2027/16 (2013.01); B29K 2075/00 (2013.01); B29K 2077/00 (2013.01); B29K 2267/046 (2013.01); B29K 2995/0063 (2013.01); B29K 2995/0068 (2013.01); B29L 2007/00 (2013.01)

(56) References Cited

U.S. PATENT DOCUMENTS

| | | | | |
|---|---|---|---|---|
| 4,048,428 A * | 9/1977 | Baird, Jr | ............ | B29C 47/0023 526/343 |
| 4,410,587 A * | 10/1983 | Fair | ................ | B29C 47/0023 442/51 |
| 4,519,909 A * | 5/1985 | Castro | ................ | A01N 25/10 210/500.27 |
| 4,540,623 A * | 9/1985 | Im | ..................... | B32B 27/08 264/173.12 |
| 4,617,207 A * | 10/1986 | Ueki | ................... | C08J 5/18 264/176.1 |
| 4,629,650 A | 12/1986 | Kataoka | | |
| 4,948,648 A * | 8/1990 | Dadgar | ................ | B32B 5/18 428/316.6 |
| 4,960,549 A * | 10/1990 | Brooks | ................ | B29C 67/2235 264/148 |
| 4,988,740 A | 1/1991 | Walter et al. | | |
| 5,000,992 A | 3/1991 | Kelch | | |
| 5,045,254 A * | 9/1991 | Peelman | ............. | B29C 47/0026 264/209.2 |
| 5,405,565 A * | 4/1995 | Sumida | ............. | B29C 47/0021 264/173.14 |
| 5,658,526 A * | 8/1997 | Rastogi | ............... | B29C 47/0026 264/564 |
| 5,968,643 A * | 10/1999 | Topolkaraev | ............... | C08J 9/18 428/305.5 |
| 6,071,580 A | 6/2000 | Bland et al. | | |
| 6,103,149 A | 8/2000 | Stankiewicz | | |
| 6,117,375 A * | 9/2000 | Garrett | .................... | B29C 44/30 156/247 |
| 6,284,810 B1 * | 9/2001 | Burnham | .............. | B29C 44/322 264/45.9 |
| 6,696,504 B1 | 2/2004 | Hayashi et al. | | |
| 6,846,439 B2 * | 1/2005 | Kadonaga | ................. | C08F 2/32 264/48 |
| 7,083,849 B1 | 8/2006 | Albrecht et al. | | |
| 7,101,501 B2 * | 9/2006 | Shih | ........................ | B24B 37/24 264/139 |
| 7,731,878 B2 * | 6/2010 | Wood | ..................... | G10K 11/16 264/156 |
| 8,092,727 B2 * | 1/2012 | Maurer | .................. | B29C 44/352 264/46.1 |
| 8,158,689 B2 * | 4/2012 | Baker | .................... | B32B 5/245 521/50 |
| 10,464,247 B2 | 11/2019 | Lindenfelzer et al. | | |
| 2001/0010849 A1 | 8/2001 | Blizard et al. | | |
| 2001/0018121 A1 | 8/2001 | Okamoto et al. | | |
| 2005/0159496 A1 | 7/2005 | Bambara et al. | | |
| 2006/0068187 A1 | 3/2006 | Krueger et al. | | |
| 2010/0089565 A1 * | 4/2010 | Duan | .................... | E21B 43/082 166/51 |
| 2012/0232175 A1 | 9/2012 | Lindenfelzer et al. | | |
| 2013/0175026 A1 * | 7/2013 | Chakraborty | .......... | C08J 9/0071 166/228 |

FOREIGN PATENT DOCUMENTS

| | | | |
|---|---|---|---|
| JP | S59-124815 A | 7/1984 | |
| JP | 8-142156 A | 6/1996 | |
| JP | 2001-212865 A | 8/2001 | |
| JP | 2004-262217 A | 9/2004 | |
| JP | 2004-269611 A | 9/2004 | |
| JP | 2011-093294 A | 5/2011 | |
| JP | 2013-185074 A | 9/2013 | |
| KR | 20070039106 A * | 4/2007 | ............ B29C 48/18 |
| WO | WO 2006/011521 A1 | 2/2006 | |
| WO | WO 2006/045513 A1 | 5/2006 | |

OTHER PUBLICATIONS

International Search Report and Written Opinion dated Aug. 1, 2013 for Application No. PCT/US2013/034112.
International Preliminary Report on Patentability dated Oct. 9, 2014 for Application No. PCT/US2013/034112.
Hawkins et al., Cell Morphology and Mechanical Properties of Rigid Polyurethane Foam. J Cell Plast. May 1, 2005;41(3):267-85.

* cited by examiner

METHOD OF FORMING POLYMERIC FOAM AND RELATED FOAM ARTICLES

RELATED APPLICATIONS

This application claims priority to U.S. Provisional Patent Application Ser. No. 61/618,281, which was filed on Mar. 30, 2012 and is incorporated herein by reference in its entirety.

FIELD OF INVENTION

The invention relates generally to polymeric foam and more particularly to a method of forming polymeric foam and related foam articles.

BACKGROUND OF INVENTION

Polymeric foams include a plurality of cells (or voids) formed within a polymer matrix. By replacing solid plastic with voids, polymeric foams use less raw material than solid plastics for a given volume. Thus, raw material savings increase as the density of a foam decreases.

It can be challenging to process certain polymeric materials (e.g., low melt strength polymeric materials) as foams. For example, it can be challenging to maintain a quality (e.g., fine) cell structure and/or good surface appearance when processing certain polymeric materials because there is a tendency for the foam cells to grow and/or become distorted. The large and/or distorted cells can also compromise the properties (e.g., strength) of the resulting foams.

Accordingly, a technique for producing a polymeric foam having a quality cell structure and/or good surface appearance would be desirable, particularly when the polymeric material has a low melt strength.

SUMMARY OF INVENTION

Methods of forming polymeric foams, as well as the related articles are described herein.

In one aspect, a method of forming a polymeric foam is provided. The method comprises extruding a first stream and at least a second stream to form an extrudate. The first stream comprises a polymeric material and a blowing agent and the second stream comprises a polymeric material. The extrudate includes a polymeric foam layer and a polymeric skin layer. The method further comprises separating the polymeric foam layer from the polymeric skin layer; and collecting the polymeric foam layer.

In one aspect, a foam is provided. The foam comprises a non-crosslinked polymeric material. The polymeric material is selected from the group consisting of polyamides, fluoropolymers, PLA (poly(lactic acid)), aliphatic polyester (PHA), polysulfones, polyurethanes, and co-polymers and blends thereof. The foam has a water vapor transmission of greater than 150 (g-200 micron/m$^2$-24 hours).

In one aspect, an article comprising a non-crosslinked polyether-block-amide foam is provided.

In one aspect, a method of forming a non-crosslinked polyether-block-amide polymeric foam is provided. The method comprise conveying a stream comprising polyether-block-amide polymeric material and a blowing agent in an extruder. The method further comprises extruding the stream through a die to form an extrudate comprising polyether-block-amide polymeric foam.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All of the patent publications incorporated herein by reference are incorporated herein by references in their entireties. In cases of conflict or inconsistency between the disclosure of an incorporated reference and the present specification, the present specification should control.

DETAILED DESCRIPTION

Methods of forming polymeric foams are provided. As described further below, the methods may involve co-extruding a foam layer along with one or more skin layers. In some embodiments, the skin layer(s) may be removed (e.g., in a peeling operation); while, in other embodiments, the skin layer(s) may form part of the final article. The methods are particularly well suited for producing polymeric foams from polymeric materials that are considered to be difficult to foam by those of skill in the art (e.g., low melt strength polymeric materials including polyether-block-amide (e.g., PEBAX®), amongst others). The polymeric foams may have small cell sizes and/or high quality surfaces. In addition, the foams can have attractive properties (e.g., strength, high water vapor transmission, etc.), while providing the materials savings associated with foam materials as compared to solid polymer materials. In some embodiments, the foams may be films formed in blown film or cast film processes; and, in other embodiments, the foams may be in the form of a sheet. The foams may be used in a variety of applications.

Figure 1:
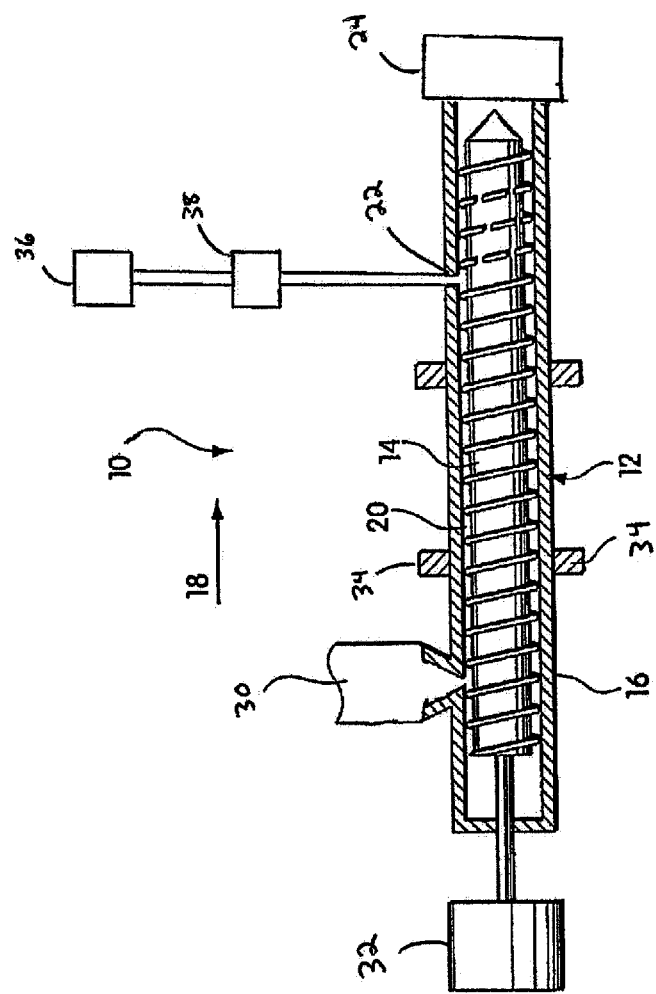
FIG. 1 shows a polymer foam processing system according to an embodiment.

Referring now to FIG. 1, a polymer processing system 10 is illustrated schematically. The system includes an extruder 12 which houses a screw 14 that rotates within a barrel 16 to convey, in a downstream direction 18, polymeric material in a processing space 20 between the screw and the barrel. A blowing agent can be introduced into the stream of polymeric material, for example, through a blowing agent port 22. The stream of polymeric material and blowing agent is extruded through a die 24 fluidly connected to the processing space and fixed to a downstream end of the barrel. As described further below, the die can be configured to form an annular foam extrudate in some embodiments. In other embodiments, the die can be configured to form a sheet extrudate.

In some embodiments, the die is constructed to co-extrude the extrudate along with one or more skin layers to produce a multi-layer extrudate. For example, two skin layers (e.g., formed of solid polymeric material) may respectively be formed on either side of a foam layer so that the foam layer is between the two skin layers. In embodiments that involve co-extrusion, one or more additional extruders (not shown) may be used to process the material that forms the one or more skin layers. In some embodiments, all of the extruder(s) in the system are connected to the same die. In some embodiments, the first stream is extruded through a first die, and the skin layer is extruded through a second die positioned proximate the first die such that the multi-layer extrudate is formed. The first die may be associated with a first extruder and the second die may be associated with a second extruder. In embodiments which include multiple extruders, the additional extruders may not include a blowing agent port, particularly if the skin layer(s) are formed of solid (i.e., unfoamed) polymeric materials.

In embodiments which include one or more skin layers, the process may also involve a peeling operation. The peeling operation generally involves separating the skin layer(s) from the foam layer. In some embodiments, the foam layer and skin layer(s) may be separately collected, for example, on respective roller(s). The foam layer may be sold in layer form and/or further processed to form the desired foam article. The skin layer(s) may also be sold in layer form and/or further processed, as desired, to form articles. In some embodiments, the skin layer(s) may be subsequently re-ground and re-used in a blown film process to form skin layer(s), as described above.

In some embodiments, the peeling operation may take place in line with the extrusion process. For example, the peeling operation may be a downstream step after the extrudate is extruded. However, it should be understood that the peeling operation may not be in line with the extrusion process and may take place at a later time. That is, the extrudate including the polymer foam layer and the skin layer may be collected, stored and/or shipped, and at a later time the foam layer may be separated from the skin layer. In some of these embodiments, the foam layer may be separated from the skin layer by a different entity than the entity that manufactures the extrudate.

In some embodiments in which the skin layer(s) are present, the foam layer is not separated from the skin layer(s). In these embodiments, the extrudate collected includes a foam layer and skin layer(s), for example, adhered to the foam layer (e.g., a foam layer arranged between two skin layers. The extrudate may be processed into the final article which includes the foam layer and skin layer(s).

In general, the foam extrudate may be in a variety of forms which can further processed as desired. In some embodiments, the foam extrudate is in a sheet form and the sheet may be collected using conventional techniques (e.g., rollers).

In some embodiments, the foam extrudate may be in the form of a bubble which is blown and further processed to form a blown film. In such embodiments, air may be injected into the bubble (e.g., via a passageway through the center of the die) to provide pressure which causes the bubble to expand. Air entering the bubble replaces air leaving it, so that a relatively constant pressure may be maintained to promote uniform thickness. The bubble can be pulled away from the die by a series of rollers. As the bubble is pulled, it may be cooled from the exterior and interior using cooling devices (e.g., cooling ring) to solidify the blown foam film. In this embodiment, the first set of rollers in the series is used to flatten the bubble thereby forming two flat film constructions. The film constructions may be slit to form one or two films.

In some embodiments, the foam extrudate may be cast to form a cast film. In such embodiments, the thin film may be extruded through a slit onto a chilled, highly polished turning roll, where it is quenched from one side. The film can pass through a series of additional rollers and may be collected after being wound on the final roll.

As noted above, the methods described herein are particularly well-suited for forming foams from polymeric materials that are considered, by those of skill in the art, difficult to foam using conventional techniques. Such polymeric materials include, for example, certain low melt strength polymeric materials. Suitable polymeric materials to be processed using the methods described herein include, amongst others, polyamides (e.g., nylon, polyether-block-amide (e.g., PEBAX®)), fluoropolymers (e.g., polyvinylidene fluoride (PVDF)), PLA (poly(lactic acid)), aliphatic polyester (PHA), polysulfones, polyurethanes, as well as co-polymers and blends of such polymeric materials.

Advantageously, the methods may be able to process materials to form high quality foams without the need to crosslink such materials which otherwise adds cost and processing complications. That is, the foams may comprise a non-crosslinked material (i.e., a material that is substantially free of crosslinking).

In some embodiments, it may be preferred that the material is polyether-block-amide (e.g., PEBAX®) and, in particular, non-crosslinked polyether-block-amide (e.g., PEBAX®). As known to those of skill in the art, polyether-block-amide (e.g., PEBAX®) is a copolymer that includes polyamide blocks and polyether blocks.

It should be understood that the polymeric materials, in some cases, may be mixed, or otherwise combined, with other polymeric materials and/or additives. For example, in some cases, the polymeric materials may include a nucleating agent such as talc.

As noted above, some embodiments utilize one or more skin layer(s) which are co-extruded with the polymer foam layer. Without being bound by any theory, it is believed that the skin layer(s) can lead to a number of advantageous effects including: providing a support structure against which the foam layer may expand; encapsulating the foam layer (e.g., when an upper and lower skin layer is provided) to increase the rate of cooling; and, when co-extruded, increasing the pressure in the die which can lead to greater pressure drops when exiting the die which, in turn, can enhance the cell nucleation process. These effects can limit cell growth and/or coalescence thereby contributing to forming a high quality foam cell structure.

In embodiments which include skin layer(s), the layer(s) may be formed of polymeric material that is different than the polymeric material used to form the foam layer. In some embodiments, the skin layer material is immiscible with the polymeric foam material. The skin layer material should also be compatible with its purpose. For example, the skin layer material should be one that readily separates from the polymer foam material during a peeling operation if that is desired. In some cases, the skin layer material may be a relatively inexpensive polymer. Suitable skin layer materials may include polyolefins such as polyethylene (e.g., low-density polyethylene) and polypropylene. In embodiments in which the skin layer(s) are retained as a portion of the final article, the skin layer material may be selected to impart desired characteristics to the article (e.g., stiffness).

In a typical process, the polymeric material may be introduced into the extruder using a standard hopper 30. The screw is connected, at its upstream end, to a drive motor 32 which rotates the screw within the barrel. Positioned along the barrel are temperature control units 34. The control units can be electrical heaters, can include passageways for temperature control fluid, and or the like. Units can be used to heat a stream of polymeric material within the barrel to facilitate melting, and/or to cool the stream to control viscosity. The temperature control units can operate differently at different locations along the barrel, that is, to heat at one or more locations, and to cool at one or more different locations. Any number of temperature control units can be provided. Temperature control units also can be supplied to heat the die to which the extrusion system is connected.

The polymeric material may be provided in pellet form and introduced into the polymeric processing space from the hopper. The polymeric material is conveyed in a downstream direction as the screw rotates. Heat and shear forces arising from the rotating screw, act to soften the pellets. Eventually, the softened pellets have been gelated, that is, welded together to form a uniform fluid stream substantially free of air pockets.

As noted above, the methods may involve using a blowing agent. In some embodiments and as shown in FIG. 1, a physical blowing agent may be introduced into the stream of polymeric material through the blowing agent port. In other embodiments, a chemical blowing agent may be used. The chemical blowing agent may be used along with, or instead, of a physical blowing agent. The chemical blowing agents may be blended with, or added to, the polymeric material pellets or otherwise introduced into the stream. A blowing agent port may not be utilized when using a chemical blowing agent. Any of a wide variety of known chemical blowing agents may be used.

In embodiments in which a physical blowing agent is used, the physical blowing agent can be introduced from a blowing agent source 36 connected to the blowing agent port. Any of a wide variety of physical blowing agents known to those of ordinary skill in the art such as hydrocarbons, chlorofluorocarbons, nitrogen, carbon dioxide, and the like, and mixtures, can be used. In some preferred embodiments, the source provides carbon dioxide, or nitrogen, or a mixture thereof as a blowing agent. Blowing agents that are in the supercritical state in the extruder may be preferred in some embodiments, particularly supercritical carbon dioxide and/or nitrogen.

In some embodiments carbon dioxide is used in combination with other blowing agents such as nitrogen, and in other embodiments carbon dioxide is used alone with no other blowing agents present. In other embodiments carbon dioxide can be used with other blowing agents so long as the other blowing agents do not materially alter the blowing process. When nitrogen is used, similarly it can be used alone, in combination with another blowing agent (e.g. carbon dioxide) that adds to or changes the blowing agent properties, or in combination with another agent that does not materially change the blowing process.

In embodiments that utilize physical blowing agents, the foams may be substantially free of residual chemical blowing agents or by-product of chemical blowing agent. Such films may have certain advantages in some applications.

A pressure and metering device 38 typically is provided between the blowing agent source and the port. The metering device can be used to meter the blowing agent so as to control the amount of the blowing agent in the polymeric stream within the extruder to maintain a level of blowing agent at a particular level. In some preferred embodiments, the device meters the mass flow rate of the blowing agent. The blowing agent is generally less than about 10% by weight of polymeric stream and blowing agent; in some embodiments, the blowing agent may be less than about 5% by weight of polymeric stream and blowing agent; in some embodiments, the blowing agent may be less than about 2.5% by weight of polymeric stream and blowing agent; and, in some embodiments, the blowing agent may be less than about 1% by weight of polymeric stream and blowing agent.

When carbon dioxide is used as a blowing agent, it may be possible in some embodiments to use relatively low amounts of blowing agent such as less than about 2.5%, or less than about 1%, by weight of polymeric stream and blowing agent.

When nitrogen is used as a blowing agent, it may be possible in some embodiments to use very low amounts of blowing agent such as less than about 1.0%, less than about 0.5%, or less than about 0.1%, by weight of polymeric stream and blowing agent.

In general, as described further below, use of a nucleating additive (e.g., talc) may enable lower blowing agent percentages.

Although the blowing agent port can be located at any of a variety of locations along the barrel, according to some embodiments it is located just upstream from a mixing section of the screw and at a location of the screw where the screw includes unbroken flights. Blowing agent port configurations which may be suitable in some embodiments have been described in U.S. Pat. No. 6,284,810 which is incorporated herein by reference in its entirety. U.S. Pat. No. 6,284,810 also describes extrusion systems and processes which may be suitable in some embodiments. In some embodiments, one or more blowing agent ports may be utilized which include one or more orifices. However, certain systems may have a single blowing agent port and/or a single orifice.

In some embodiments, a single-phase solution of blowing agent and polymer may be formed in the polymer processing space in the extruder. Formation of a single-phase solution may be particularly conducive to forming a foam structure having small cell sizes, as described further below. The single-phase solution may be nucleated upon being extruded through the die. For example, the solution may experience a rapid pressure drop which induces nucleation when passing through the die.

It should be understood that, in some embodiments, a mixture of blowing agent and polymer which is not a single-phase solution may be extruded through the die. Such embodiments, however, may not be as well-suited for forming small cell foams and/or foams having small aspect ratios.

Figure 2B:
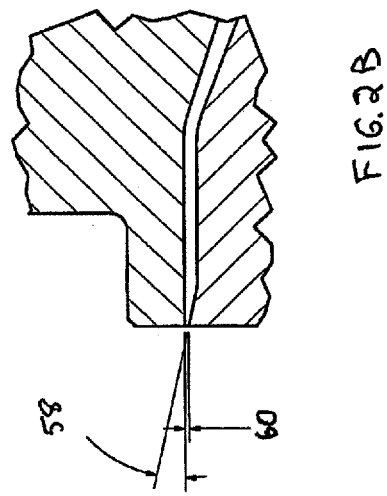
FIG. 2B is a section of the die shown in FIG. 2A.
Figure 2A:
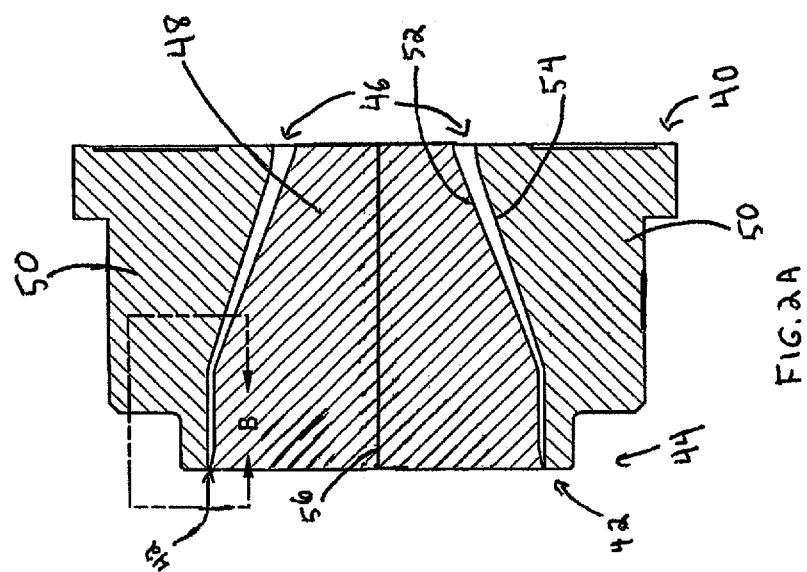
FIG. 2A is a schematic of a die used in connection with the system of FIG. 1 according to an embodiment.

FIGS. 2A and 2B illustrates die 24 which may be used in connection with the system of FIG. 1 according to an embodiment. The die includes an upstream end 40 which can be mounted to the end of the barrel and a die outlet 42 at a downstream end 44 of the die. The die includes an inner passageway 46 which is fluidly connected the polymer processing space in the extruder and extends to the die outlet. In the illustrative embodiment, the inner passageway has an annular shape. The passageway is formed between an inner die body 48 and an outer die body 50 with the inner die body forming an inner wall 52 of the passageway and the outer die body forming an outer wall 54 of the passageway. The dimension between the inner wall and the outer wall may be referred to as die gap 60 (FIG. 2B).

The passageway has a shape and dimensions (die geometry) to control the shape of the extrudate. In certain preferred embodiments, the die geometry may be selected to provide conditions that are conducive to forming the desired cell structure (e.g., low cell aspect ratio, small cell size). For example, in some embodiments, the passageway(s) has an outward taper approaching the die outlet. This may be achieved by the inner wall of the passageway tapering outwardly from a center line 56 of the die. The inner wall may taper outward at an angle 58. Particularly good cell structures have been observed in some embodiments when the outward taper angle is between 4° and 20°; or, between 10° and 15°. In certain preferred cases when the inner wall of the passageway tapers outwardly from a center line, the outer wall of the passageway dos not taper outwardly at as large an angle as the inner wall. In these cases, this results in the formation of a die gap that converges in a downstream direction approaching the die outlet. In some of these cases, the outer wall of the passageway may not taper inwardly or outwardly relative to the center of the die when approaching the die outlet; in some cases, the outer wall tapers inwardly relative to the center of the die when approaching the die outlet; and, in some cases, the outer wall tapers outwardly relative to the center of the die when approaching the die outlet but to a lesser extent (i.e., smaller outward taper angle) than the outward taper of the inner wall.

In embodiments that include a converging die gap and are used to produce films, the gap may converge to a dimension of less than or equal to 0.050 inch; in some cases, less than or equal to 0.035 inch; in some cases, less than or equal to 0.020 inch; in some cases less than 0.015 inch; in some cases, less than or equal to 0.010 inch; and, in some cases, less than or equal to 0.005 inch. In some of these cases, the gap may converge to a dimension of at least 0.001 inch The above-described die geometry can influence the nucleation of the polymer and blowing agent stream (e.g., single-phase solution of polymer and blowing agent). In particular, the outward taper and converging gap construction has been observed to be very effective in creating nucleation conditions that contribute to the formation of a desired cell structure (e.g., small cell size, small cell aspect ratio) and mechanical properties, as well as high quality surfaces.

It should be understood that other die designs may also be suitable including flat dies that form sheets.

As noted above, the foams described herein may comprise polymeric materials that have been conventionally difficult to foam including low melt strength materials. Suitable materials include polyamides (e.g., nylon, polyether-block-amide (PEBAX®)), fluoropolymers (e.g., polyvinylidene fluoride (PVDF)), PLA (poly(lactic acid)), aliphatic polyester (PHA), polysulfones, polyurethanes, as well as co-polymers and blends of such polymeric materials. In some embodiments, it may be preferred that the material is polyether-block-amide (e.g., PEBAX®) and, in particular, non-crosslinked polyether-block-amide (e.g., PEBAX®), as noted above. It should be understood that the foams may comprise a variety of additives including nucleating agents such as talc.

As noted above, in some embodiments, the polymeric foam may have small cell sizes. For example, the average maximum dimension of the cells may be less than 200 micron. As used herein, the maximum dimension of a cell is the largest of the length (l, FIG. 3), thickness (t, FIG. 3) and width (not shown in FIG. 3, transverse to both length and thickness). The maximum dimension can be determined by examining a representative number of cells using SEM analysis. The average maximum dimension is the numeric mean of the maximum dimensions of the representative number of cells. In some embodiments, the average maximum dimension of the cells may be less than 150 micron; in some embodiments, less than 100 micron; and, in some embodiments, less than 75 micron.

Figure 3:
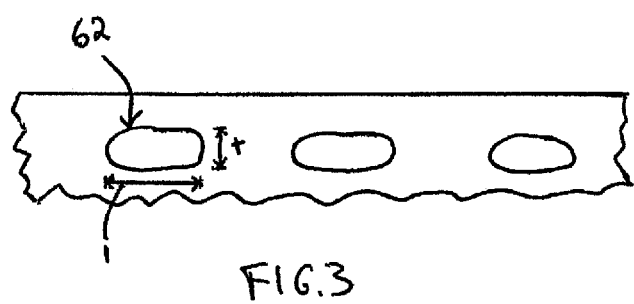
FIG. 3 is a schematic of a portion of a polymeric foam.

FIG. 3 is a schematic of a portion of a foam (e.g., a blown film) form including a plurality of cells 62 according to an embodiment. As shown, the cells have some degree of orientation which can result, for example, from a blowing process. In some embodiments, the films may have an average cell aspect ratio (i.e., ratio of cell length (l) to cell thickness (t)) of less than 10:1. In some embodiments, the average cell aspect ratio may be smaller such as less than 5:1, less than 4:1 or less than 3:1. Such low cell aspect ratios may contribute to the excellent mechanical properties that are obtainable in foams (e.g., blown film foams) of the present invention. However, it should be understood that not all foams have the cell aspect ratios within the above-noted ranges.

It should also be understood that, in some embodiments, the cells may have little or no degree of orientation. For example, the cells may be substantially spherical in shape. Such cell structures generally result from processes (e.g., sheet extrusion) other than blown film processes.

In some embodiments, the foams may have a substantially closed cell structure. This means that a majority of the cells are not interconnected with other cells.

In general, the polymer foams may be produced over a wide range of density. The density of the film may be selected depending on the requirements of the application in which the film is used. The density may be, for example, between 0.05 g/cm$^3$ and 1.1 g/cm$^3$. In some embodiments, the density may be between 0.3 g/cm$^3$ and 0.9 g/cm$^3$; and, in some embodiments, the density may be between 0.4 g/cm$^3$ and 0.7 g/cm$^3$. In some cases, the density reduction may be between 5% and 90% as compared to the solid polymeric material; and, in some cases, between 10% and 50% as compared to the solid polymeric material.

In general, the polymer foams may have a variety of thicknesses such as between 20 microns and ½ inch. In some cases, the polymer foams are films which are relatively thin. The thickness may be typical of a polymer foam blown film and may be, for example, between 20 microns and 350 microns; and, in some cases, between 35 microns and 100 microns. In some cases, the polymer foams are sheets which can have a range of thickness including up to ½ inch. It should also be understood that these ranges are not limiting and that, in some embodiments, the polymer foams may have thicknesses outside the above-noted ranges.

Advantageously, the processes described herein may enable production of foams (including films) that are very uniform in thickness. In particular, the die geometries described above are conducive to forming foams having such uniformities. In some embodiments, the thickness may vary by less than +/−10% across the width of the foam.

As noted above, the polymer foams may have a number of desirable characteristics including excellent mechanical properties.

In some embodiments, the polymer foams have a high water vapor transmission. The water vapor transmission is a measure of the flux of water vapor as it passes through a foam sample. The high water vapor transmission may be characterized using standard tests such as procedure MOD-LEM/PERM005 Method A (23° C./50% RH). For example, the water vapor transmission may be greater than 150 (g-200 micron/m$^2$-24 hours); in some cases, the water vapor transmission may be greater than 600 (g-200 micron/m$^2$-24 hours) such as between 600 (g-200 micron/m$^2$-24 hours) and 1500 (g-200 micron/m$^2$-24 hours).

In some embodiments, the polymer foams with the high water vapor transmission may be a polyether-block-amide (e.g., PEBAX®) foam which may be non-crosslinked. It should also be understood that these ranges are not limiting and that, in some embodiments, the polymer foams may have a water vapor transmission outside the above-noted ranges; and, in some cases the polymer foams may not have high water vapor transmissions.

The polymer foams may also have high quality surfaces which, for example, may be very smooth and/or glossy. Such surfaces may be attractive in appearance and/or may be decorated as desired.

The desirable properties and characteristics enable the polymer foams to be used in a variety of applications.

The function and advantage of these and other embodiments of the present invention will be more fully understood from the examples below. The following examples are intended to illustrate the benefits of the present invention, but does not exemplify the full scope of the invention.

Example 1—PEBAX®

This example illustrates the production of a 3-layer polymer film comprising a PEBAX® foam layer and two solid LDPE skin layers which were subsequently separated from the PEBAX® foam layer.

A stream of polyether-block-amide was created in an extruder, as described above. Nitrogen was introduced through a multi-hole blowing agent port into the stream and created a mixture of nitrogen and PEBAX®. The percentage of $N_2$ by weight is approximately 0.1% of the total mixture. The stream is mixed together in the extruder to form a single-phase solution.

Meanwhile, streams of LDPE (un-foamed) were introduced into the co-extrusion die (as the outside layers). With all 3 streams in the die head, they reached the exit and the pressure fell at the lip exit. The pressure reduction caused the middle layer to foam. The die lip taper angle was between 4 and 20 degrees while the gap was less than 0.012".

The PEBAX® foam became encapsulated between the two skin layers as air was used to blow up and make the internal bubble. After these events, air calibration, slitting and layer separation processes took place prior to winding the layers into separate rolls. The LDPE layers that were peeled off were free of any debris of dissimilar material and then subsequently re-ground and re-extruded in a subsequent blown film process.

Prior to separation, the resulting thickness of the three layer film was 120 microns. The LDPE layers were each 15 microns. The PEBAX® foam layer had a smooth surface, a 90 micron thickness and a density of 0.65 $g/cm^3$. This represented a reduction in density from solid PEBAX® of 30%. The thickness variation was +/−8%. The cell aspect ratio was about 3:1 by SEM analysis.

Example 2—PVDF

This example illustrates the production of a 3-layer film comprising a polyvinylidene fluoride (PVDF) foam layer and two solid LDPE skin layers which were subsequently separated from the PVDF foam layer.

A stream of PVDF was created in an extruder. Nitrogen was introduced through a multi-hole blowing agent port into the stream and creates a mixture of nitrogen and PVDF. The percentage of $N_2$ by weight is approximately 0.1% of the total mixture. The stream was mixed together to form a single-phase solution.

Meanwhile, 2 streams of LDPE (un-foamed) were introduced into the co-extrusion die (as the outside layers). With all 3 streams in the die head, they reached the exit and the pressure fell at the lip exit. The pressure reduction caused the middle layer to foam. The die lip taper angle was between 4 and 20 degrees while the gap was less than 0.012".

The PVDF foam became encapsulated between two skin layers as air was used to blow up and make the internal bubble. After these events, air calibration, slitting and layer separation processes took place prior to winding the layers into separate rolls. The LDPE layers that were peeled off were free of any debris of dissimilar material and then subsequently re-ground and re-extruded in a subsequent blown film process.

Prior to separation, the resulting thickness of the three layer film was 120 microns. The LDPE layers were each 12.5 microns. The PVDF foam layer had a smooth surface, a 95 micron thickness and a density of 1.05 $g/cm^3$. This represented a reduction in density from solid PVDF of 28%. The thickness variation was +/−8%. The cell aspect ratio was about 3:1 by SEM analysis.

Example 3—PLA

This example illustrates the production of a 3-layer film comprising a polylactide or poly(lactic acid) (PLA) foam layer and two solid LDPE skin layers which were subsequently separated from the PVDF foam layer.

A stream of PLA was created in an extruder. Nitrogen was introduced through a multi-hole blowing agent port into the stream and creates a mixture of nitrogen and PVDF. The percentage of $N_2$ by weight is approximately 0.1% of the total mixture. The stream was mixed together to form a single-phase solution.

Meanwhile, 2 streams of LDPE (un-foamed) were introduced into the co-extrusion die (as the outside layers). With all 3 streams in the die head, they reached the exit and the pressure fell at the lip exit. The pressure reduction caused the middle layer to foam. The die lip taper angle was between 4 and 20 degrees while the gap was less than 0.012".

The PLA foam became encapsulated between two skin layers as air was used to blow up and make the internal bubble. After these events, air calibration, slitting and layer separation processes took place prior to winding the layers into separate rolls. The LDPE layers that were peeled off were free of any debris of dissimilar material and then subsequently re-ground and re-extruded in a subsequent blown film process.

Prior to separation, the resulting thickness of the three layer film was 120 microns. The LDPE layers were each 12.5 microns. The PLA foam layer had a smooth surface, a 95 micron thickness and a density of 0.7 $g/cm^3$. This represented a reduction in density from solid PLA of 42%. The thickness variation was +/−8%. The cell aspect ratio was about 3:1 by SEM analysis.

Example 4—PHA

This example illustrates the production of a 3-layer film comprising an aliphatic polyester (PHA, which is a derivative of corn sugar and polyhydroxybutyric acid (PHB) copolymers) foam layer and two solid LDPE skin layers which were subsequently separated from the PHA foam layer.

A stream of PHA was created in an extruder. Nitrogen was introduced through a multi-hole blowing agent port into the stream and creates a mixture of nitrogen and PVDF. The percentage of $N_2$ by weight is approximately 0.1% of the total mixture. The stream was mixed together to form a single-phase solution.

Meanwhile, 2 streams of LDPE (un-foamed) were introduced into the co-extrusion die (as the outside layers). With all 3 streams in the die head, they reached the exit and the pressure fell at the lip exit. The pressure reduction caused the middle layer to foam. The die lip taper angle was between 4 and 20 degrees while the gap was less than 0.012".

The PHA foam became encapsulated between two skin layers as air was used to blow up and make the internal bubble. After these events, air calibration, slitting and layer separation processes took place prior to winding the layers into separate rolls. The LDPE layers that were peeled off were free of any debris of dissimilar material and then subsequently re-ground and re-extruded in a subsequent blown film process.

Prior to separation, the resulting thickness of the three layer film was 150 microns. The LDPE layers were each 15 microns. The PHA foam layer had a smooth surface, a 120 micron thickness and a density of 0.82 g/cm$^3$. This represented a reduction in density from solid PHA of 42%. The thickness variation was +/−8%. The cell aspect ratio was about 3:1 by SEM analysis.

Example 5—PEBAX® Monolayer Tubes

This example illustrates the production of a PEBAX® monolayer foamed tube. The tube is suitable for use in electronics applications including wire and cable applications.

A stream of PEBAX® was created in an extruder. Nitrogen was introduced through a multi-hole blowing agent port into the stream and creates a mixture of nitrogen and PEBAX®. The percentage of N$_2$ by weight varied from approximately 0.05-0.085 wt % of the total mixture. The stream was mixed together to form a single-phase solution which was extruded through a die in the form of a tube-shaped foam extrudate. The die convergence angles used range approximately 4 degrees with a gap of approximately 0.010".

The tube-shaped extrudate had a density of between 0.45 g/cc to 0.85 g/cc depending on the concentration of N$_2$ by weight. This correlated to a reduction in density between 15% and 55%. The tube was 'pre-skinned' and calibrated with metered air in the middle of the tube, and the dimensions were measured by a laser guidance system. The inside diameter was fixed at 0.035" while the outside diameter was varied between 0.051 to 0.138" depending on the wall thickness requirement for the application.

The thickness variation was +/−8%. The cell aspect ratio was about 2:1 by SEM analysis.

What is claimed:

1. A method comprising:
    extruding a first stream and a second stream to form an annular extrudate, wherein the first stream comprises a single-phase solution of a first polymeric material comprising non-crosslinked polyether-block-amide and a blowing agent and the second stream comprises a second polymeric material, wherein the extrudate includes a foam layer comprising the first polymeric material comprising non-crosslinked polyether-block-amide and a skin layer comprising the second polymeric material, and wherein the first stream nucleates into said foam layer upon exiting an extrusion die inner passageway having an outward taper converging in a downstream direction approaching the die outlet;
    blowing to expand the annular extrudate;
    separating the foam layer from the skin layer of the expanded extrudate; and
    collecting the separated foam layer, wherein the foam layer, after being collected, has a smooth surface and a plurality of cells having an average aspect ratio of less than 3:1 and an average maximum dimension of less than 200 microns, and wherein the collected foam layer comprises non-crosslinked polyether-block-amide and has a substantially closed cell structure.

2. The method of claim 1, wherein said extruding further comprises co-extruding the first stream along with the second stream through the die to form the extrudate.

3. The method of claim 2, further comprising co-extruding a third stream along with the first stream and the second stream, the third stream comprising a third polymeric material, and the extrudate further comprising a second skin layer comprising the third polymeric material.

4. The method of claim 1, wherein the average maximum dimension of the cells is less than 150 microns.

5. The method of claim 1, wherein the blowing agent is a physical blowing agent and the physical blowing agent is present in an amount less than about 2.5% by weight of the first stream.

6. The method of claim 1, further comprising forming the single-phase solution in the extruder.

7. The method of claim 1, wherein the die has an inner die wall that tapers outward approaching the die outlet at an angle of between 4° and 20° with respect to a centerline of the die.

8. The method of claim 1, wherein the extrudate is further processed to form a sheet.

9. The method of claim 1, wherein separating the foam layer from the skin layer occurs in the same processing line as the co-extrusion step.

10. The method of claim 1, further comprising storing the extrudate including the foam layer and the skin layer prior to separating the foam layer from the skin layer.

11. The method of claim 1, wherein the inner passageway of the extrusion die has a die gap converging to a dimension of less than or equal to 0.050 inch.

12. The method of claim 1, wherein the inner passageway of the extrusion die has a die gap converging to a dimension of from at least 0.001 inch to less than or equal to 0.005 inch.

13. The method of claim 1, wherein the foam layer has a density of between 0.3 g/cm$^3$ and 0.9 g/cm$^3$.

14. The method of claim 1, wherein the foam layer has a thickness variation of +/−8%.

15. The method of claim 1, wherein the smooth foam layer surface is glossy.

* * * * *